Sept. 4, 1934.   E. F. ZEINER   1,972,508
EXPANSION JOINT FOR INSULATED STRUCTURES
Filed Jan. 16, 1932
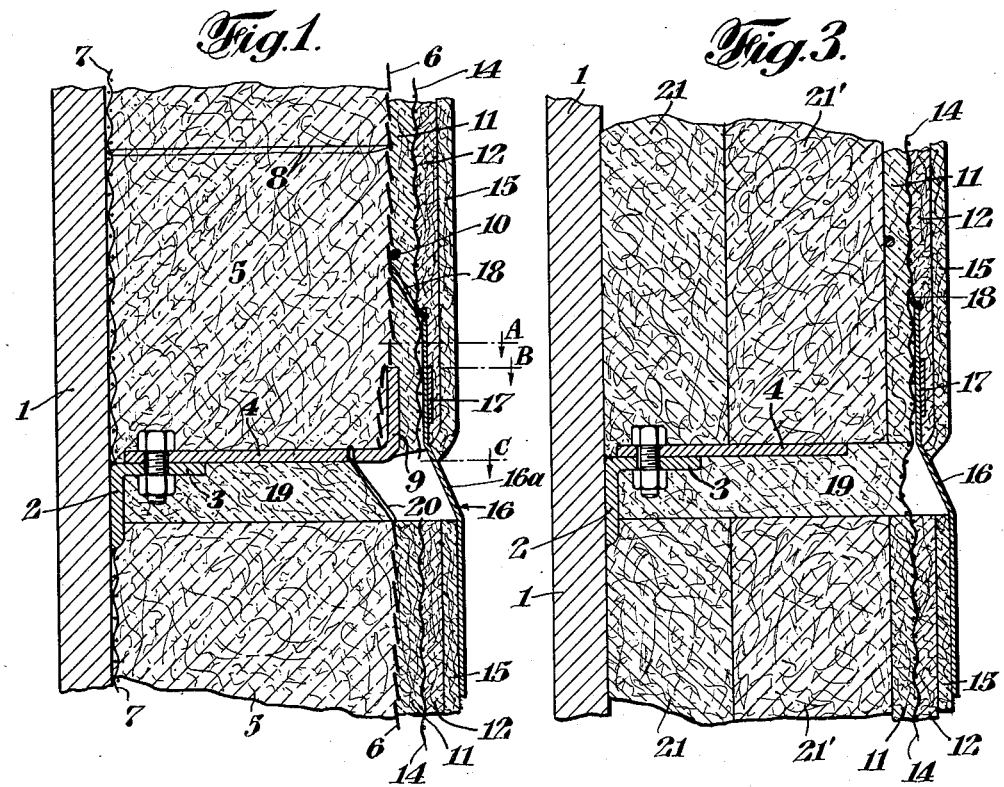
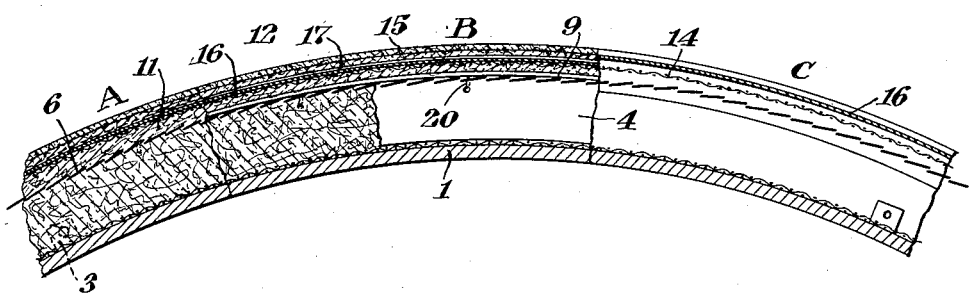
INVENTOR
Eugene F. Zeiner
BY Kenyon & Kenyon
ATTORNEYS Patented Sept. 4, 1934

1,972,508

UNITED STATES PATENT OFFICE 1,972,508

EXPANSION JOINT FOR INSULATED STRUCTURES

Eugene F. Zeiner, Flushing, N. Y., assignor to The Philip Carey Manufacturing Company, a corporation of Ohio Application January 16, 1932, Serial No. 587,131

15 Claims. (Cl. 72—0.5)

My invention relates to an expansion joint particularly adapted to insulation applied to heated structures or vessels such, for example, as oil fractionating towers.

In order to prevent objectionable loss of heat in such vessels, it is customary to apply to the outer surface thereof a covering of heat insulating material, preferably protected by a covering of waterproofing material. Due to the changes of temperature therein, such vessels expand and contract; and where the vessel is of considerable length, as in the case of oil fractionating towers, the expansion and contraction is considerable, resulting in the cracking of the insulation and waterproofing if they are applied in continuous layers.

One object of the invention is to provide between adjacent sections or tiers of insulation and waterproofing an expansion joint which will not only prevent cracking of the insulation and waterproofing upon expansion and contraction of the vessel but also effectively prevent the entrance of moisture between such adjacent sections or tiers.

Another object of the invention is to provide an expansion joint of the character referred to which will not damage the waterproofing by the transmission thereto of heat from the shell of the vessel.

A further object of the invention is to provide an expansion joint which will prevent the loss of heat from the vessel between adjacent sections or tiers of insulation.

Other objects, features and advantages of the invention will appear more fully in the following detailed description and appended claims.

The accompanying drawing forming a part of this specification illustrates two embodiments of the invention.

In the drawing,

Fig. 1 is a fragmentary vertical sectional view of the wall of the vertical cylindrical vessel embodying my invention.

Fig. 2 is a fragmentary horizontal sectional view respectively on the lines A, B and C.

Fig. 3 is a fragmentary vertical sectional view similar to Fig. 1 but showing a modification.

Referring to the drawing, the vertical cylindrical wall 1 of the vessel has secured around the periphery thereof, as by spot welding, horizontally spaced angle iron clips 2 having outwardly projecting horizontal flanges 3. Secured to the flanges 3 is a ring 4 extending peripherally around the vessel. The said ring serves as a support upon which rests the lower edge of a sheet or sheets 5 of heat insulation. The heat insulation 5, as shown, is arranged in a plurality of vertically spaced tiers, and it is to be understood that each of these tiers is supported at its lower edge in the manner described.

As shown in Fig. 1, the insulation 5 is of the flexible sheet type comprising a body portion of suitable flexible insulating material, such as rock wool, confined between suitable reinforcing material such as the expanded metal lath 6 and the wire mesh 7. The lath 6 and mesh 7, as shown, are secured together at intervals by tie wires 8. To properly support the flexible insulation 5 the ring 4 is formed with an outer upwardly extending flange 9 confining the lower edge portion of the insulation. Means such as the circumferential cables 10 serve to hold the insulation firmly against the wall 1.

Finishing coats or layers 11 and 12 of suitable heat insulating materials, such as asbestos cement, are applied to the outer face of the insulation 5. A reinforcement of suitable material, such as galvanized wire mesh 14, is preferably employed in connection with the finishing layers 11 and 12, this reinforcement as shown being arranged between these layers. Upon the outer surface of the finishing layer 12, I apply a layer 15 of waterproofing material, which may be an asphalt composition mixed with asbestos fiber. The wire mesh reinforcement 14 tends to prevent localized cracking in the finishing and waterproofing layers 11, 12 and 15.

As moisture tends to cause a breaking down of insulation, it is important to exclude it from the expansion space between the tiers 5 of insulation. To this end, I provide the flashing 16, which may be made of any suitable material, such as copper. It is important that this flashing be at all times in sealing relation to both of the adjacent tiers of insulation regardless of the motion of either or both of said tiers upon expansion and contraction of the vessel 1. The movement of the insulation with respect to the vessel 1 includes not only the movement of the upper portion of each course of insulation incidental to differences of expansion between the insulation and the vessel but also occasional movement of the lower portion of each course of insulation upwardly out of engagement with support 4, due to protuberances such as rivet heads which project from wall 1 of the vessel into the insulation and serve to carry the latter along with the adjacent portion of the container wall. To assure a moisture tight expansion joint and seal between adjacent portions of insulation, I have, as shown, secured the flashing 16 to the portion of the insulation above the expansion space so that the flashing is carried with that portion of the insulation in case of any movement thereof with respect to the wall 1 of the vessel, the lower portion of the flashing being in the form of a cylinder having telescopic sliding contact with the outer surface of the waterproofing layer 15 below the expansion space. The upper and lower portions of the flashing are, as shown, connected by a conical intermediate portion 16a surrounding the expansion space. The upper portion of the flashing is preferably secured against the reinforcement 14. Any suitable securing means may be employed, such as the circumferential band or ring 17. The outer finishing layer 12 and the waterproofing layer 15 are preferably applied so as to cover the upper portion of the flashing. The flashing 16 may, if desired, be tied to the expanded metal reinforcement 6, as by wires 18 spaced horizontally about the vessel 1.

It will be seen that there is a body of nonmetallic heat insulating material between the metallic ring 4 and the surrounding or overlying metallic flashing 16 and that there is no metallic connection whereby the high temperature of the metallic wall 1 may be freely conveyed through the flashing 16 to the waterproofing 15. Such waterproofing is commonly made of materials, such as asphalt, which deteriorate under high heat; and the elimination of high temperature metal communication between the shell of the vessel and the flashing and adjacent waterproofing accordingly not only tends to avoid heat losses from the vessel but also insures greater durability for the waterproofing.

To prevent the free circulation of high temperature air between the adjacent tiers of insulation, the space between these tiers is packed with resilient material 19, such as long asbestos fiber, to insulate said space against the passage of heat therethrough. As shown, this material is held in place peripherally by horizontally spaced tie wires 20 arranged between the annular supporting member 4 and the reinforcement 6 on the opposite side of the expansion joint. These wires also tend to support the upper portion of the said reinforcement. By reason of its resilient nature, the material 19 remains packed in the expansion space for a distance outwardly from the wall 1 regardless of movement of the insulation 5 due to expansion and contraction of the vessel 1. The packing 19 accordingly prevents transmission of heat from the wall of the vessel to the flashing and adjacent waterproofing, thus preventing damage to the waterproofing by heat transmitted from the shell of the vessel.

In the modification shown in Fig. 3, the insulation employed is of the block type. Where the temperature of the vessel is high, it is found that the greatest efficiency in insulation is obtained, as shown, by arranging a layer 21 of high temperature insulation against the wall 1 of the vessel insulated and by covering the layer 20 with another layer 21' of insulation of the type found more efficient for lower temperatures, such as 85% magnesia. The high temperature insulation may be of any suitable type designed not to deteriorate to an objectionable extent under high temperatures. Such insulation, comprising mixtures of scientifically determined portions of various materials, including asbestos and compositions of silicate, magnesium, calcium and aluminum, is available in the market. In this form of my invention, the supporting member 4 may be in the form of a flat ring without a marginal flange, as the insulation is in rigid block form. The finishing and waterproofing layers 11, 12 and 15, as shown in this form of the invention, are applied the same as shown in Fig. 1. Similarly, the flashing 16 is secured to the reinforcement 14 as by ring 17. This form of the invention does not require the metal lath reinforcement shown at 6 in Fig. 1; and the flashing is tied by the wires 18 to the reinforcement 14 instead. In this form of the invention the resilient insulation 19 is, as shown, confined by the reinforcement 14.

While I have shown two preferred embodiments of my invention, it is understood that changes within the scope of the appended claims may be made without departing from the spirit of the invention.

I claim:

1. A vessel having a covering arranged in tiers, means for supporting each tier, an expansion joint between adjacent tiers including a metal sealing member secured to the covering on one side of the joint and in sealing relation to the covering on the other side of the joint.

2. A vertical vessel having a covering arranged in horizontal tiers, means for supporting each tier, and an expansion joint between adjacent tiers, said expansion joint including a metal sealing member secured to the covering on one side of the joint and extending movably over the covering on the other side of the joint.

3. A vertical vessel having a heat insulating covering arranged in horizontal tiers, means for supporting each tier, and an expansion joint between adjacent tiers, said expansion joint including a sealing member of waterproof material secured to the covering on one side of the joint and extending slidably over the covering on the other side of the joint.

4. A vertical vessel having spaced supporting members secured to the vessel and having horizontal faces, a ring resting upon said faces, heat insulation surrounding said vessel and resting upon said ring, and a flashing secured to said insulation and surrounding said supporting members and ring.

5. A vertical structure having vertically spaced supports, tiers of insulation carried by said supports respectively, and a seal between adjacent tiers of insulation comprising a metal flashing secured to one tier of insulation and extending movably over the adjacent tier of insulation.

6. A vertical vessel having vertically spaced circumferential supports, tiers of waterproofed insulation carried by said supports respectively, and a seal between adjacent tiers of insulation comprising a flashing of waterproof material secured to one tier of insulation and extending movably over the adjacent tier of insulation.

7. A vertical vessel having vertically spaced circumferential supports, tiers of waterproofed insulation carried by said supports respectively, the space between adjacent tiers of said insulation containing a packing of resilient material thereby insulating said space, and a flashing secured to one tier of insulation and extending movably over the adjacent tier of insulation.

8. A vertical vessel having a circumferential outwardly projecting support, a section of insulation for the vessel having its edge resting on said support, a section of insulation below said support, and a flashing of waterproof material secured to one section of the insulation and overlying both sections thereof.

9. A vertical structure having a circumferential outwardly projecting support, a section of insulation for the structure having its edge resting on said support, a section of insulation below said support, and a metal flashing of waterproof material secured to one section of the insulation and overlying both sections thereof.

10. A structure formed of heat conducting material having a covering of heat insulation arranged in sections, means for securing the said covering to the body of the structure, and an expansion joint in said covering between adjacent sections including a metal sealing member secured to the covering on one side of the joint and in movable sealing relation to the covering on the other side of the joint.

11. A structure formed of heat conducting material having a covering of heat insulation arranged in sections, means for securing the said covering to the body of the structure, and an expansion joint in said covering between adjacent sections including a sealing member of waterproof material secured to the covering on one side of the joint and in movable sealing relation to the covering on the other side of the joint.

12. A vessel formed of heat conducting material, a covering of heat insulation arranged in sections around said vessel, means for securing the heat insulation to the vessel, and an expansion joint in said covering including a metal flashing between adjacent sections of the heat insulation, and secured to one of them, said flashing being insulated against heat from the vessel.

13. A vertical vessel having a circumferential outwardly projecting support, a body of waterproofed heat insulation for the vessel having its edge resting on said support, a body of waterproofed heat insulation below said support and a flashing of waterproof material secured to the heat insulation on one side of said support but free to move relatively to the heat insulation on the other side of the support.

14. A vessel formed of heat conducting material, a covering therefor comprising spaced tiers of heat insulation, means for securing the covering to the vessel, a resilient packing between adjacent tiers of insulation forming a heat insulation therein, and a flashing of waterproof material secured to one tier of heat insulation and closing the space between adjacent tiers thereof but permitting relative movement of said adjacent tiers.

15. A vertical vessel having an outwardly extending support provided with an upwardly extending flange, a body of heat insulation resting on said support and surrounding and confined at its lower edge by said flange, a body of heat insulation below said support in spaced relation to said first-named body of heat insulation, and a flashing of waterproof material secured to the heat insulation on one side of said support and in movable sealing relation to the heat insulation on the other side of said support.

EUGENE F. ZEINER.